United States Patent [19]

Watkins

[11] 4,048,882
[45] Sept. 20, 1977

[54] POST TURRET TOOL HOLDER FOR ENGINE LATHES

[76] Inventor: Richard F. Watkins, 1168 Oak Glen Road, Santa Ynez, Calif. 93460

[21] Appl. No.: 713,608

[22] Filed: Aug. 11, 1976

[51] Int. Cl.² .............................................. B23B 29/00
[52] U.S. Cl. .................................................. 82/36 A
[58] Field of Search .................. 82/36 A, 36 R; 29/40

[56] References Cited

U.S. PATENT DOCUMENTS

| 2,369,600 | 2/1945 | Nielsen | 82/36 A |
|---|---|---|---|
| 3,127,802 | 4/1964 | Zierden | 82/36 A |
| 3,213,722 | 10/1965 | Maglica | 82/36 R |
| 3,725,987 | 10/1973 | Kurimoto | 29/40 |

*Primary Examiner*—Harrison L. Hinson
*Attorney, Agent, or Firm*—Clarence A. O'Brien; Harvey B. Jacobson

[57] ABSTRACT

A post turret tool holder for an engine lath has a body member rotatably mounted at the tool holder station of the lathe. This body member is provided with a plurality of peripheral faces each located extending from a diameter passing through the axis of rotation of the body member and at an acute angle opening inwardly toward the axis of rotation. In this manner, each face of the body member forming the turret can be oriented for selectively presenting a tool disposed in a socket provided in the face in proper position relative to the work holder without bringing adjacent tools into a position of possible interference with the work holder and workpiece and permitting the socket to be of sufficient depth into the body member to securely hold various tools commonly employed with engine lathes without interference with the axis of rotation of the body member.

3 Claims, 7 Drawing Figures

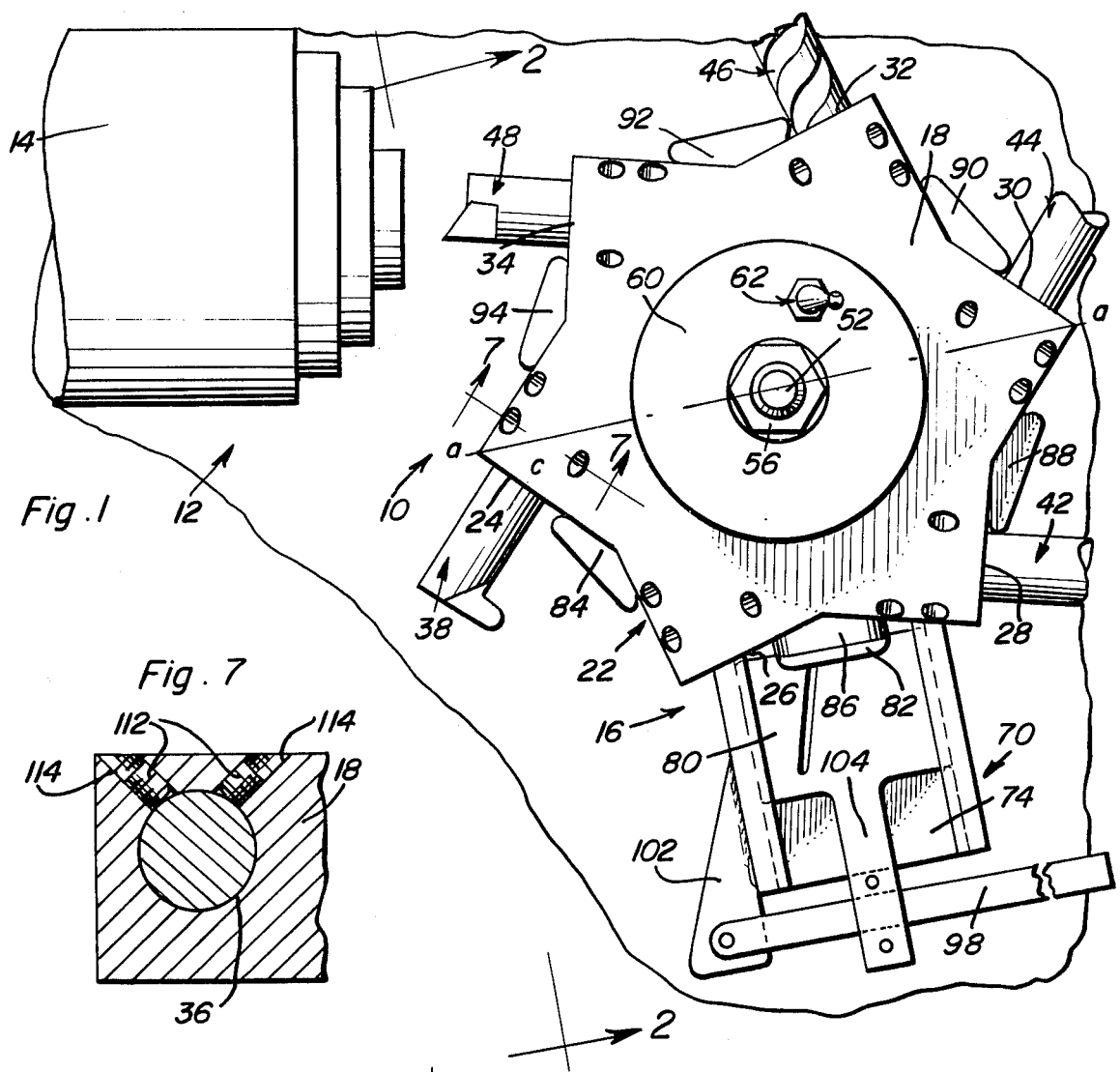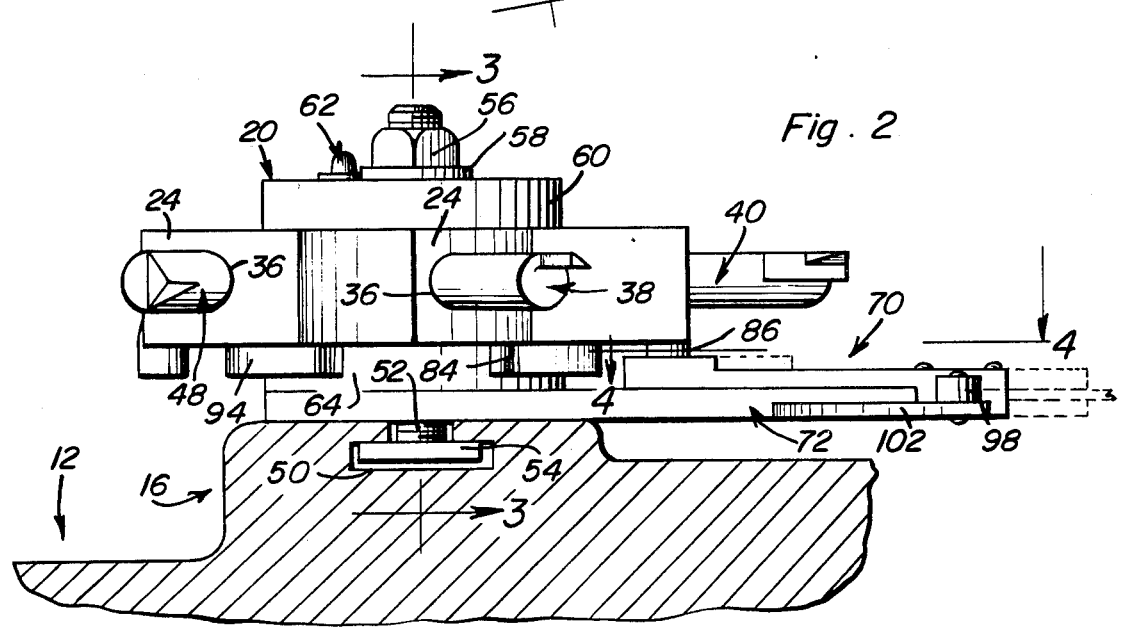

POST TURRET TOOL HOLDER FOR ENGINE LATHES

BACKGROUND OF THE INVENTION

1. Field of the Invention

This invention relates generally to tool holders, and particularly to a post turret tool holder for use with conventional engine lathes, and the like.

2. Description of the Prior Art

The use of rotating turrets on engine lathes is well known and commonly employed. Typically, these turrets are provided with tool receiving sockets extending radially from a pivot point of the turret, which arrangement limits the depth of the sockets into the turret and the angular spacing between the sockets about the turret with a resulting limitation on the number of tools that can be mounted on a single turret.

U.S. Pat. Nos: 1,272,188, issued July 9, 1918, to F. M. Bawden; 3,498,163, issued Mar. 3, 1970, to J. L. Jeanneret; and 3,717,912, issued Feb. 27, 1973, to H. Lahm, disclose turrets which revolve about horizontally disposed axis. While the turrets of U.S. Pat. Nos. 3,498,163 and 3,717,912 are provided with radially extending tool holding sockets, U.S. Pat. No. 1,272,188 discloses the use of tool holding sockets provided in a radial face of a turret. None of these prior devices, however, permits a large number of tools to be disposed in deeply inwardly extending sockets disposed in the turret in order to permit a maximum number of tools to be mounted on a single turret without possibility of interference by the tools with the work holder and workpiece mounted on the associated lathe, and the like.

U.S. Pat. No. 3,550,489, issued Dec. 29, 1970, to L. W. Kuhn, et al., discloses a turret head for a quick-change tool wherein the turret rotates about an axis disposed at an oblique angle with respect to the bed of the lathe and is provided with a bevelled face on which a plurality of tool holding sockets are provided. Further, U.S. Pat. No. 2,373,535, issued Apr. 10, 1945, to L. B. Brown, discloses the use of a turret mounted for rotation about a substantially vertical axis and provided with a generally square configuration in plan for permitting the tool holding sockets to extend substantially parallel to the side surfaces of the turret in order to pass by the shaft mounting the turret and permit deeper insertion of the sockets into the turret while simultaneously spacing the tool holding sockets in such a manner as to prevent interference with the work holder and workpiece by the tools adjacent the tool in working position.

SUMMARY OF THE INVENTION

It is an object of the present invention to provide a turret tool holder for various lathes, and the like, which permits deeper penetration of tool holding sockets into the turret and which provides for a maximum number of tool holding sockets without interference with the work holder and associated workpiece of the lathe by tools mounted in tool holding sockets disposed adjacent the tool holding socket of a tool disposed in working position relative to the work holder and workpiece associated with the lathe.

It is another object of the present invention to provide a post turret tool holder for lathes, and the like, which has a rugged and reliable arrangement for indexing the turret and placing each tool holding position of the turret in proper position relative to a workpiece and to restrain the turret from movement while a tool associated with a particular tool holding position of the turret is operating on the workpiece.

These and other objects are achieved in accordance with the present invention by providing a post turret tool holder having: a body member rotatably disposed at the tool holder station of a lathe and provided with a substantially planar peripheral face located extending from a diameter passing through the axis of rotation of the body member at an acute angle with respect to the diameter and toward the axis of rotation of the body member. The peripheral face of the body member is provided with a socket disposed substantially perpendicular to the plane of the face for receiving a cutting tool with the face being oriented for selectively presenting the tool disposed in the socket in proper position relative to a workpiece mounted in a chuck or other work holder provided on the lathe.

By the aforementioned arrangement of peripheral face and associated socket, a plurality of such faces and sockets can be provided about the periphery or rim, of the body from the tool holding turret. This arrangement permits the sockets to extend at an angle with respect to the axis of rotation of the turret in order to permit penetration of the socket into the turret to a desired depth and to dispose the adjacent sockets at such an angle with respect to one another that there will be no possibility of tools disposed in sockets adjacent a one of the sockets positioned for presenting a tool to the work holder and/or workpiece associated with the lathe from interfering with the work holder and workpiece.

Another advantageous feature of the present invention provides an indexing arrangement mounted on the lathe and selectively engageable with the body member froming the turret for straining the body member against rotation when each of the tool retaining sockets is presented to the work holder. This indexing arrangement, however, will permit the body member to be rotated from tool retainer to tool retainer relative to the work holder as desired by operator manipulation of the indexing arrangement in a simple and convenient manner.

The indexing arrangement preferably includes a slide guide affixed to the lathe at the tool holding station thereof, and a slide movably disposed in the guide and provided with a recess which selectively engages projections mounted on the body member and associated with each of the tool holding sockets for sequentially engaging the projection in the recess and restraining the body member from rotation. A slot provided in the slide and communicating with the recess can permit the slide to spread and snap onto the projections so as to furnish a positive action for engagement of the projections by the slide.

A lever pivotally mounted on the slide guide and slidably connected to the slide is attached to the slide by a window provided in a projecting handle so as to permit an operator of the lathe to selectively and sequentially move the slide into and out of engagement with the projections in order to index a desired tool into proper position for operating on a workpiece disposed in the work holder of the lathe.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, top plan view showing a post turret tool holder according to the present invention mounted on a conventional lathe.

FIG. 2 is a fragmentary, sectional view taken generally along the line 2—2 of FIG. 1.

FIG. 7 is an enlarged, fragmentary, sectional view taken generally along the line 7—7 of FIG. 1.

DESCRIPTION OF THE PREFERRED EMBODIMENTS

Figure 3:
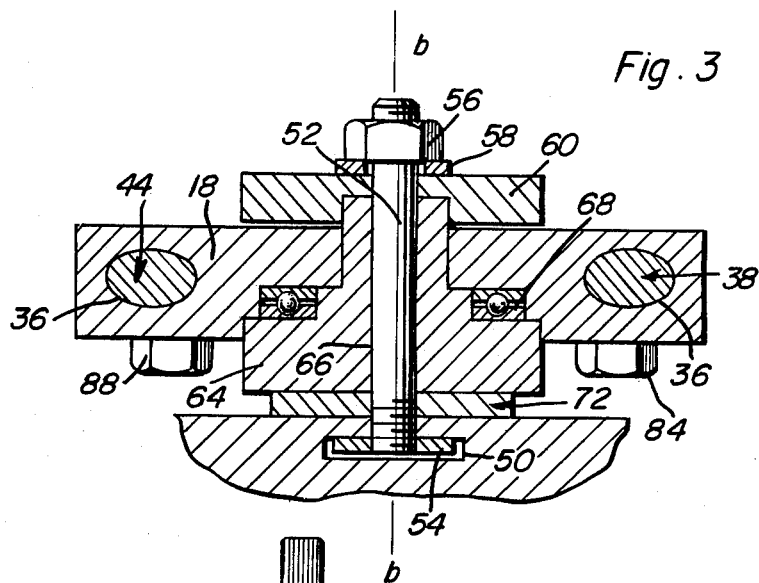
FIG. 3 is a fragmentary, sectional view taken generally along the line 3—3 of FIG. 2.

Referring now more particularly to FIGS. 1 through 3 of the drawings, a post turret tool holder 10 according to the invention is shown as mounted on a conventional engine lathe 12, and the like, which includes a conventional work holder 14, such as a chuck or collet, and a tool holder station generally designated by the reference numeral 16. Holder 10 includes a body member 18 rotatably disposed at station 16 as by a shaft assembly 20. Body member 18 includes a periphery 22 on which are provided a plurality of substantially planar faces 24, 26, 28, 30, 32, and 34. Each of these faces is located extending from a diameter such as that designated a—a which passes through the axis of rotation b—b of body member 18 at an acute angle c with respect to diameter a—a and toward the axis of rotation b—b. Each of the faces 24, 26, 28, 30, 32, and 34 is provided with a tool retaining socket 36 disposed extending inwardly of body member 18 at substantially a right angle with respect to the plane of the associated face and receiving a conventional tool, such as those disignated 38, 40, 42, 44, 46, and 48, respectively. By this arrangement, the sockets 36 can extend into body member 18 to a great depth than would be permitted if the sockets were disposed radially, while the angle between adjacent ones of the sockets is such that there is no possibility of adjacent tools interfering with one another when one of the adjacent tools is disposed in position for operating on a workpiece (not shown) mounted in the work holder 14. That is, when the tool 48 is positioned as shown in FIG. 1, neither the tool 38 nor the tool 46 will be in a position which will interfere with the work holder 14 or a workpiece mounted in the work holder.

It will be understood that while six sockets 36 have been shown in the turret 18 illustrated in the drawings, the number of sockets provided may vary. Nevertheless, the illustrated six sockets has been found to be an optimum number. In the illustrated arrangement of six sockets 36, each pointed portion of the body member 18 forms substantially a 90° angle, with the diameter a—a bisecting a pair of opposed such pointed portions accordingly creating an angle c of 45° for locating an associated one of the faces. Further, this arrangement will place adjacent ones of the tools, such as tools 38 and 48, at substantially a 60° angle with respect to one another.

The shaft assembly 20 includes a recess 50 provided in the lathe 12 at station 16 thereof. Extending into this recess 50 is the lower portion of a threaded stud 52 which threadingly engages a nut 54 disposed within recess 50 for the purpose of retaining stud 52 on lathe 12. A nut 56 disposed at the uppermost portion of the stud 52 retains on the stud 52 for rotation with respect thereto the body member 18, together with a washer 58 and a plate 60. Provided in the plate 60 is a grease fitting 62 for permitting the lower surface of plate 60, which functions as a bearing surface for the body member 18, to be periodically lubricated.

The shaft assembly 20 also includes a step spindle 64 provided with a bore 66 which receives the stud 52. Body member 18 is provided with a stepped recess in the underside thereof for receiving the spindle 64, and also forms a recess with respect to spindle 64 for receiving a thrust bearing 68 on which the body member 18 rotates. The plate 60 is also provided with a recess on the underside thereof for receiving the uppermost portion of spindle 64 in such a manner as to form an integral unit with respect to the stud 52, and to prevent plate 60 from bearing down against the upper surface of body member 18. That is, a slight gap is advantageously provided between the lower surface of plate 60 and the upper surface of body 18, in which gap a suitable grease or other lubricant (not shown) is provided to reduce friction and facilitate rotation of the body member 18. Thus, the spindle 64 and plate 60 as well as the stud 52, remain stationary while the body member 18 rotates about the thrust bearing 68.

Figure 4:
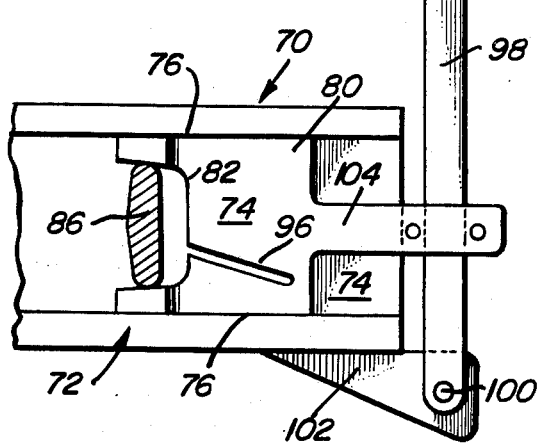
FIG. 4 is a fragmentary, sectional view taken generally along the line 4—4 of FIG. 2.
Figure 5:
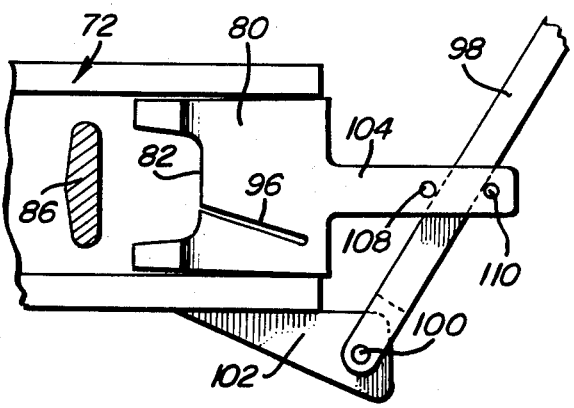
FIG. 5 is a fragmentary, sectional view similar to FIG. 4, but showing certain parts in a different position.
Figure 6:
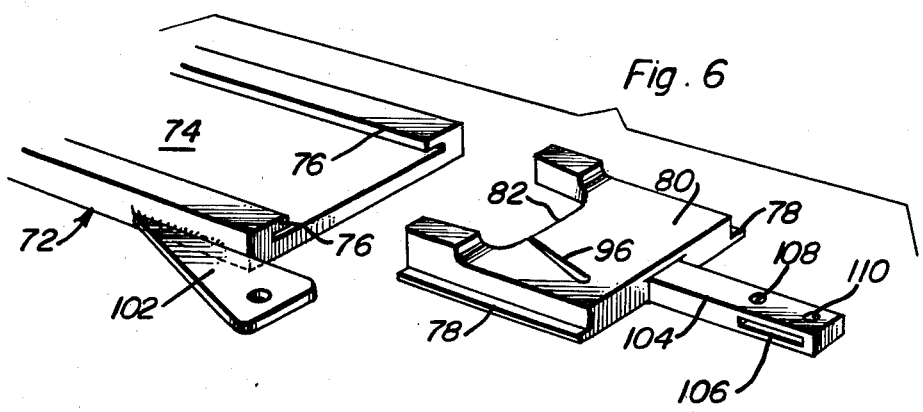
FIG. 6 is a fragmentary, exploded, perspective view showing some of the elements of the indexing arrangement as seen in FIGS. 4 and 5.

Referring now more particularly to FIGS. 4 through 6 of the drawings, an indexing arrangement 70 is mouned on lathe 12 for restraining body member 18 against motion when each of the tool retaining sockets 36 is presented to the work holder 14. This arrangement 70 assures that each socket 36 is precisely positioned when presented to work holder 14, while permitting body member 18 to be rotated in order to present a desired tool 38, 40, 42, 44, 46, and 48 to work holder 14.

Indexing arrangement 70 includes a slide guide 72 affixed to lathe 12 as by insertion of same between the surface of lathe 12 at the work holder station 16 and the spindle 64 forming the stationary part of shaft assembly 20. The upper surface of the base portion of this slide guide 72 forms a bearing surface 74, and is flanked by a pair of substantially parallel ledges 76 which form longitudinally extending grooves receiving respective ones of a pair of substantially parallel lips 78 extending from opposite sides of the lower portion of a slide 80. The latter is removably disposed in the guide 72 and retained therein by the lips 78 engaging under the ledges 76, and is provided with a recess 82 disposed in the inward side, or the side closest to the axis of rotation b—b of body member 18, so as to selectively engage locator projections 84, 86, 88, 80, 92, and 94 depending from beneath body member 18 from points adjacent the most inward portion of each of the associated ones of the peripheral faces 24, 26, 28, 30, 32, and 34. By selective and sequential engagement of slide 80 with the aforementioned projections, the body member 18 can be properly positioned and restrained from rotation while a particular one of the tools 38, 40, 42, 44, 46 and 48 is positiond opposite work holder 14.

A slot 96 is provided in slide 80 and disposed in communication with recess 82 for permitting slide 80 to spread and snap onto the projections 84, 86, 88, 90, 92, and 94. As can be seen from FIG. 4, recess 82 does not completely encompass teh aforementioned projections, projection 86 as illustrated in this figure, but merely engages the ends of the projections along the lateral faces of the recess 82. Although not illustrated, it is possible to increase the frictional gripping force of projection 86, and the like, against the side faces of the recess 82 by providing the projection with adjustable and possibly resilient separate tips at each of the longitudinal ends of the projection.

Indexing arrangement 70 also includes a lever 98 pivotally mounted on the slide guide 72 as by a pin 100 engaging in ear 102 projecting laterally from one side of guide 72. This lever 98 is slidably connected to a handle 104 by provision of a window 106 extending through handle 104 and provided with a pair of pins 108 and 110 which form fulcrums about which lever 98 may efficiently slide. By this arrangement, pivotal movement of the lever 98 outboard of the handle 104 will cause the slide 80 to reciprocate between the position shown in FIGS. 4 and 5 of the drawings and cause slide 80 to move into and out of engagement with the projections, such as the projection 86.

FIG. 7 shows the detail of the manner in which the various tools 38, 40, 42, 44, 46, and 48 are retained in their associated sockets 36 provided in body member 18. As illustrated, a pair of setscrews 112 can be disposed in threaded bores 114 which engage the shank of the associated tool, such as tool 36, in order to apply sufficient force to the tool to prevent the tool from being jarred loose in the associated socket 36 while the tool is performing operations on a workpiece (not shown) mounted in the work holder 14.

As can be appreciated from the above description and from the drawings, an operator (not shown) disposed in his normal position adjacent the holder 10 with the latter being disposed at station 16 where the conventional compound tool rest, and the like, would be normally arranged, can quickly and easily index the body member 18 in order to bring the appropriate one of the tools into position opposite the work holder 14 for performing various operations on a workpiece (not shown) disposed in holder 14. Tests have shown that indexing can reasonably be expected in an average time of less than three seconds. The wedging effect of the projections which partially form the recess 82 of slide 80 eliminates any rotational movement of the turret formed by body member 18. This is advantageous inasmuch as the cutting tools held in the sockets 36 will repeat positions when indexed. This is necessary when machining very close tolerance, precision machine parts. The tool must relocate or part size will change.

The illustrated six tool holes or sockets 36 are located behind the center or axis of rotation b—b of the body member 18. This places the cutting tools in about the same place as tools are normally placed in an engine lathe. Further, the tool sockets 36 are behind center to allow them to go deep into the body member 18 without interference with the thrust bearing 68 and the center post formed by the spindle 64. In addition, sockets 36 are positioned so that long tools will not interfere with the work holder 14 provided on lathe 12. The tools slide into the deep holes or sockets of the tool turret and are held as mentioned above by setscrews 112. This assembly allows for quick alignment of the cutting tool to the center line of the stock (not shown) being cut. That is, the cutting edge of turning and boring tools must be set to the center line of the lathe spindle. By rotating the tool in the tool hole, this can be done very quickly with a holder according to the invention.

A particularly advantageous feature of the invention is that the indexing arrangement eliminates all exial movement as well as rotational movement, and does not loose its ability to do so with normal wear. The forked portion which forms the recess 82 in slide 80 spreads over the locator projections 84, 86, 88, 90, 92, and 94 and spreads in the associated guide 72. This action eliminates any movement of rotation. It also jams or registers itself tightly enough to lock the assembly. This is accomplished all in one easy motion by the operator.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A post turret tool holder for an engine lathe, including a work holder and a tool holder station, comprising, in combination:
   a. a rotatable body member disposed at the tool holder station;
   b. a plurality of tool retainers provided on the body member; and
   c. indexing means mounted on the lathe for restraining the body member against motion when each of the tool retainers is presented to the work holder, while permitting the body member to be rotated from tool retainer to tool retainer relative to the work holder, and the tool retainers being repeatedly positioned accurately with respect to the work holder by the indexing means, the indexing means including a slide guide affixed to the lathe at the tool holder station, a slide movably disposed in the guide and provided with a recess, and projections mounted on the body member and associated with the tool retainers for sequentially engaging in the recess and restraining the body member from rotation, the indexing means further including a slot provided in the slide and communicating with the recess for permiting the slide to spread and snap onto the projections in order to tightly engage the projections and permit movement of the projections relative to the slide.

2. A post turret tool holder for an engine lathe, including a work holder and a tool holder station, comprising, in combination:
   a. a rotatable body member disposed at the tool holder station;
   b. a plurality of tool retainers provided on the body member; and
   c. indexing means mounted on the lathe for restraining the body member against motion when each of the tool retainers is presented to the work holder, while permitting the body member to be rotated from tool retainer to tool retainer relative to the work holder, and the tool retainers being repeatedly positioned accurately with respect to the work holder by the indexing means, the indexing means including a slide guide affixed to the lathe at the tool holder station, a slide movably disposed in the guide and provided with a recess, and projections mounted on the body member and associated with the tool retainers for sequentially engaging in the recess and restraining the body member from rotation, the indexing means including a lever pivotally mounted on the guide and slidably connected to the slide for moving the slide into and out of engagement with the projections.

3. A structure as defined in claim 2, wherein the indexing means further includes a slot provided in the slide and communicating with the recess for permitting the slide to spread and snap onto the projections in order to tightly engage the projections and permit movement of the projections relative to the slide.

* * * * *